United States Patent [19]

Kobayashi et al.

[11] Patent Number: 4,908,003
[45] Date of Patent: Mar. 13, 1990

[54] HYSTERESIS MECHANISM FOR A TORQUE VARIATION ABSORBING DEVICE

[75] Inventors: Kiyonori Kobayashi, Chiryu; Masakazu Kamiya, Toyoake; Junji Kagiyama, Kariya, all of Japan

[73] Assignee: Aisin Seiki Kabushiki Kaisha, Kariya, Japan

[21] Appl. No.: 245,900

[22] Filed: Sep. 19, 1988

[30] Foreign Application Priority Data

Sep. 19, 1987 [JP] Japan .................. 62-142295[U]

[51] Int. Cl.⁴ .................. F16D 3/14; F16F 15/12
[52] U.S. Cl. .................. 464/68; 74/574; 192/106.2
[58] Field of Search .................. 74/574; 192/106.2; 464/66, 68

[56] References Cited

U.S. PATENT DOCUMENTS 4,663,983  5/1987  Kobayashi et al. .......... 464/68 X
4,714,449 12/1987  Woerner et al. ............ 464/68

FOREIGN PATENT DOCUMENTS 2157801 10/1985 United Kingdom ............ 464/68

Primary Examiner—Daniel P. Stodola
Attorney, Agent, or Firm—Burns, Doane, Swecker & Mathis

[57] ABSTRACT

A torque variation absorbing device includes a flywheel, a spring mechanism, a torque limiting mechanism and a hysteresis mechanism. The flywheel is divided into two parts to form an inertia body. One side of the inertia body is a drive side flywheel and the other is a driven side flywheel. The hysteresis mechanism includes a friction plate, a thrust plate and a cone spring. The thrust plate has a partially bent portion and the bent portion is received in a bolt hole of an inner body of the driven side flywheel.

2 Claims, 6 Drawing Sheets

HYSTERESIS MECHANISM FOR A TORQUE VARIATION ABSORBING DEVICE

BACKGROUND OF THE INVENTION

1. Field of the Invention

This invention relates to a torque variation absorbing device which is used to take up and compensate for variations in torque fluctuations, and more particularly to a torque variation absorbing device which is installed on or connected to a crankshaft of an internal combustion engine to take up and compensate torque fluctuations produced by operation of the internal combustion engine.

2. Description of the Prior Art

A conventional torque variation absorbing device is disclosed, for example, in U.S. Pat. No. 4,663,983, issued on Feb. 12, 1987. As shown in FIG. 6 and FIG. 7, the conventional device includes a driving plate 50 attached or connected to an output shaft of an engine crankshaft 51 and a flywheel 52 which is located close to the driving plate 50.

As seen from FIG. 6, a spring mechanism 53 and a hysteresis mechanism 54 are located or positioned between the driving plate 50 and the flywheel 52. A damping and torque limiting mechanism 55 is located radially interiorly of the spring mechanism 53. In the conventional device, rotation of the engine crankshaft 51 and the torque fluctuation is transmitted to the flywheel 52 through the driving plate 50, the spring mechanism 53 and the hysteresis mechanism 54, which comprise the torque variation absorbing device. Thus, the torque variation is absorbed by the variation absorbing device.

The hysteresis mechanism 54 is located further radially interiorly of the torque limiting mechanism 55 and between the driving plate 50 and the flywheel 52. FIG. 7 illustrates the hysteresis mechanism 54 in greater detail. As seen from FIG. 7, a hysteresis plate 56, provided with a friction lining 56a of abrasive material, is partially bent and formed into a bent portion 56b. The bent portion 56b is fitted into a hole 57 bored or otherwise provided in the side plate 50b of the driving plate 50, thereby circumferentially fixing the hysteresis plate 56 to the driving plate 50. A cap 59 is fitted or otherwise positioned in the hole 57 of the side plate 50b. Likewise, the bent portion 56b of the hysteresis plate 56 is fitted in a hole 60 of the cap 59. A cone spring 58 and a ring 61 are installed between the hysteresis plate 56 and the side plate 50b. The ring 61 is installed between the cone spring 58 and the side plate 50b, thereby pressing the friction lining between the friction lining 56a and the flywheel 52 and producing a hysteresis. In the prior art device, a bolt hole 62 receives bolt 63 which extends to the sliding friction surface.

In the prior art, the friction lining 56a is provided beside the hysteresis plate 56. As to this arrangement, when the abraded dust of the friction lining is produced or released, the bent portion 56b will be hindered for the exclusion of the friction lining.

SUMMARY OF THE INVENTION

A primary object of this invention is to stabilize the friction force between a hysteresis plate and a driving plate.

Another object of this invention is to reduce the parts of the device.

Still another object of this invention is to intercept and dampen the resonance vibration in the device.

A further object of this invention is to exclude the abraded dust of the friction lining which would otherwise accumulate between the hysteresis plate of the hysteresis mechanism and the driving plate.

The torque variation absorbing device comprises a driving plate, a flywheel, a spring mechanism, a hysteresis mechanism and a torque limiting mechanism. Between the driving plate and the flywheel, the spring mechanism, the torque limiting mechanism and a hysteresis mechanism are interposed. The flywheel is divided into a flywheel body and a driven plate. A bolt hole is bored or otherwise provided in the driving plate and receives a bolt for fastening together the flywheel body and the driven plate extends to a position of sliding friction between the hysteresis mechanism and the driven plate. The frictional member of the hysteresis mechanism, positioned between the flywheel and the hysteresis mechanism, is fabricated of abrasive material mainly constructed of polyimide resin.

Other features and advantages of this invention will become apparent from the following description and the accompanying drawings.

DETAILED DESCRIPTION OF THE PREFERRED EMBODIMENT

A torque variation absorbing device constituted in accordance with a preferred embodiment of the present invention will be described with reference to the drawings.

Figure 1:
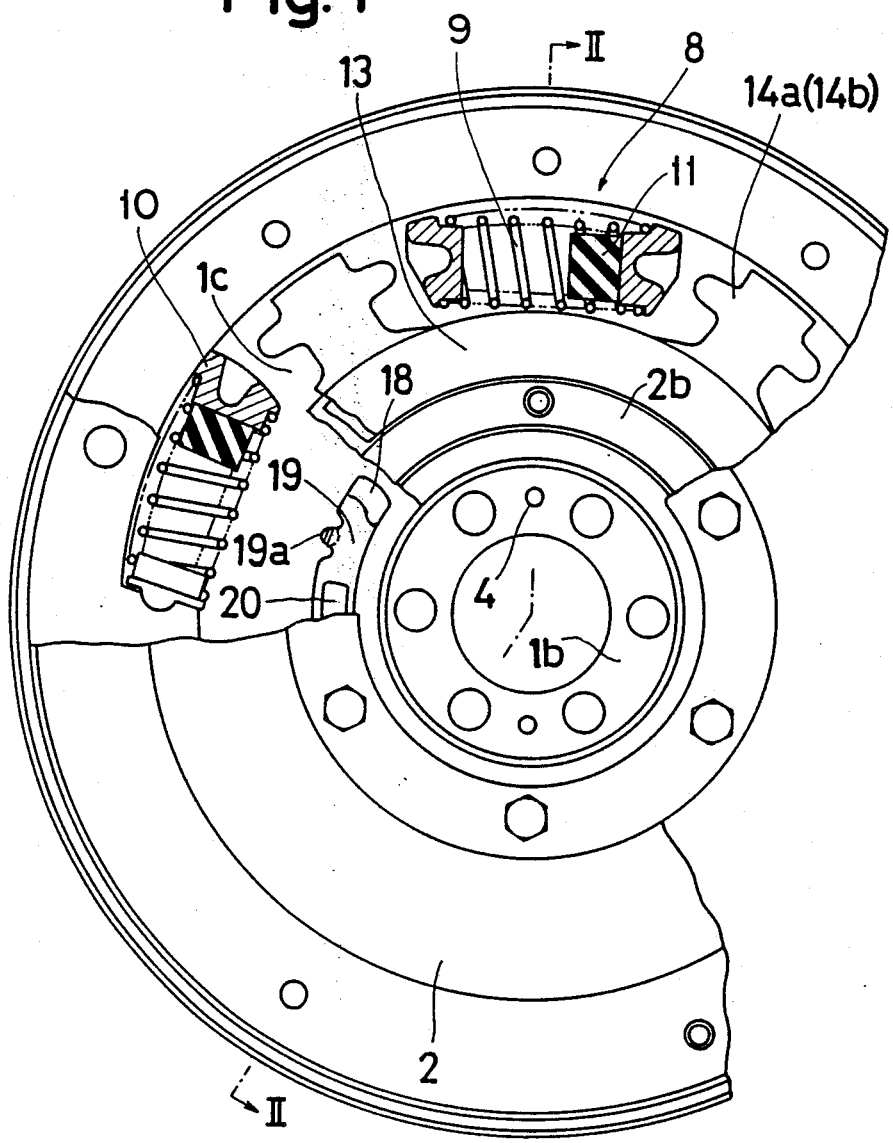
FIG. 1 is an elevational view but is partly shown in section, of the device embodying this invention.
Figure 2:
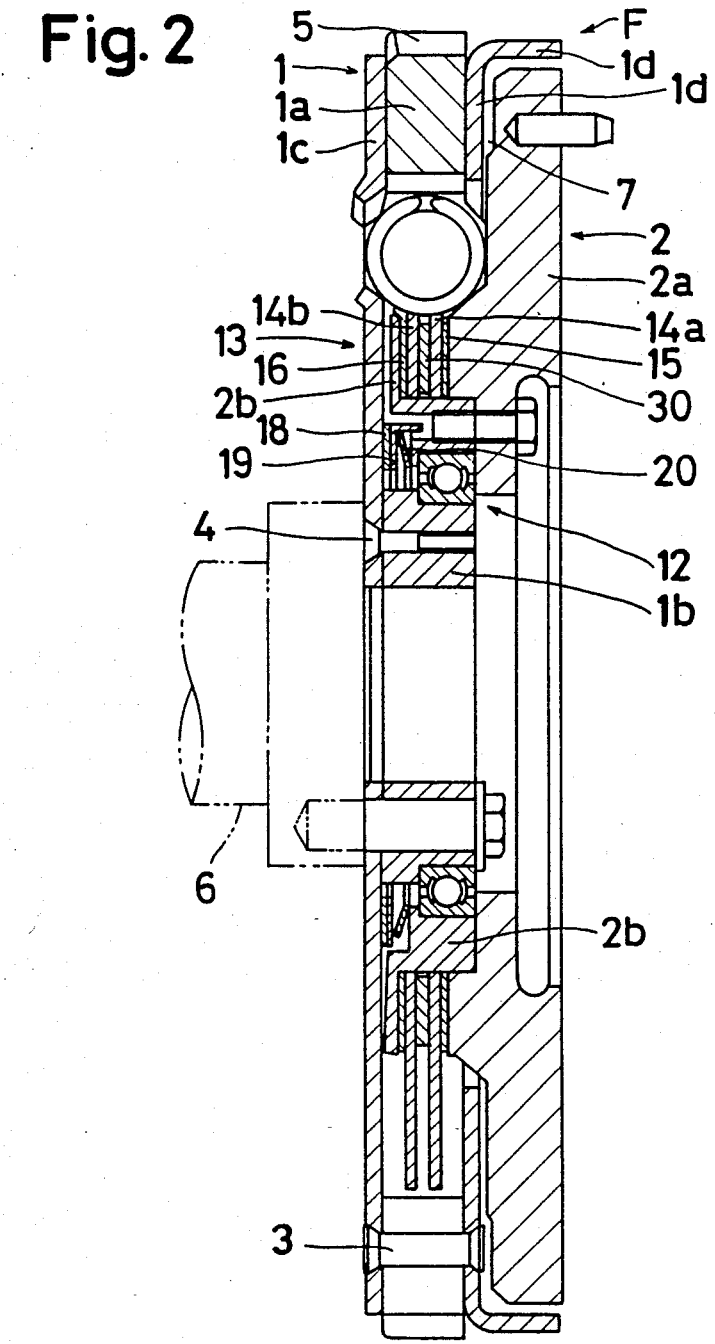
FIG. 2 is a sectional view taken substantially along the lines II—II of the FIG. 1.

Referring first to FIGS. 1 and 2 of the drawings, a device embodying this invention includes a flywheel F. The flywheel F is divided into a drive side flywheel 1 and a driven side flywheel 2. The drive side flywheel 1 comprises an outer body 1a shaped in the form of an annulus or a ring, and an inner body 1b of similar shape and steel side plates 1c and 1d which press the body 1a from both sides by a rivet 3 and a screw 4. The driven side flywheel 2 comprises an inertia body 2a shaped like a disk and an inner body 2b shaped like a ring. On a periphery of the body 1a there is press-fitted or shrink-fitted a ring gear 5 for accommodating the starting of an engine. The drive side flywheel 1 is connected to a driving shaft of an engine crankshaft 6 and the body 1a and the side plates 1c and 1d are rotated together with the crankshaft 6.

The side plate 1d which constitutes one part of the drive side flywheel 1 and which is located close to the driven side flywheel 2 has a peripheral portion 1d which is bent in an L-shape to surround an outer periphery of the driven side flywheel 2. The bent portion 1d' covers a gap 7 which extends in the radial direction between the outer body 1a and the inertia body 2a of the driven side flywheel 2.

A spring mechanism 8 is provided between the drive side flywheel 1 and the driven side flywheel 2. The spring mechanism 8 comprises a coil spring 9 and a plurality of spring seats 10. One of the spring seats 10 of each of the spring mechanisms 8 has an elastic rubber member 11 secured to the spring seat 10. A bearing means 12 is provided between the drive side flywheel 1 and the driven side flywheel 2 and rotatably supports each flywheel thereon.

A torque limiting mechanism 13 is arranged between the inertia body 2a and inner body 2b of the driven side flywheel 2. The torque limiting mechanism 13 includes a plurality of driven disks 14a and 14b. A cone spring 30 is arranged between the plurality of driven disks 14a and 14b. A friction plate 15 is arranged between the driven plate 14a and the inertia body 2a. Similarly, a friction plate 16 is arranged between the driven disk 14b and the inner body 2b.

A hysteresis mechanism 17 is arranged radially inwardly of the torque limiting mechanism 13. The hysteresis mechanism 17 comprises a friction plate 18, a thrust plate 19 and a cone spring 20. The cone spring 20 is positioned between the inner body 2b and the thrust plate 19, and the friction plate 18 is positioned between the thrust plate 19 and the side plate 1c of the drive side flywheel 1.

Figure 3:
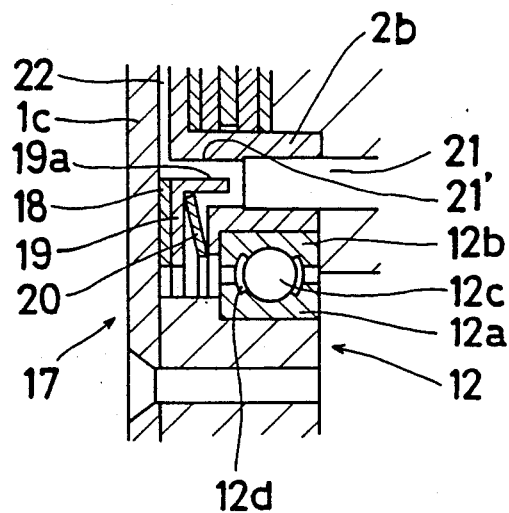
FIG. 3 is an enlarged sectional view of a hysteresis mechanism of this invention.

FIG. 3 illustrates an expanded sectional view of the hysteresis mechanism 17. As seen from FIG. 3, in the hysteresis mechanism 17, the thrust plate 19 provided with a friction plate 18 of abrasive material is partially bent so as to form a bent portion 19a which is fitted or received in a bolt hole 21 of the inner body 2b. The bearing means 12 includes an inner bearing race 12a, an outer bearing race 12b, a ball bearing 12c and a bearing seal 12d. A bolt 21 extends through the inner body 2b. The friction plate 18 is slidably connected between the thrust plate 19 and the side plate 1c. The cone spring 20 provides a tension against the thrust plate 19 and the friction plate 18.

Figure 6:
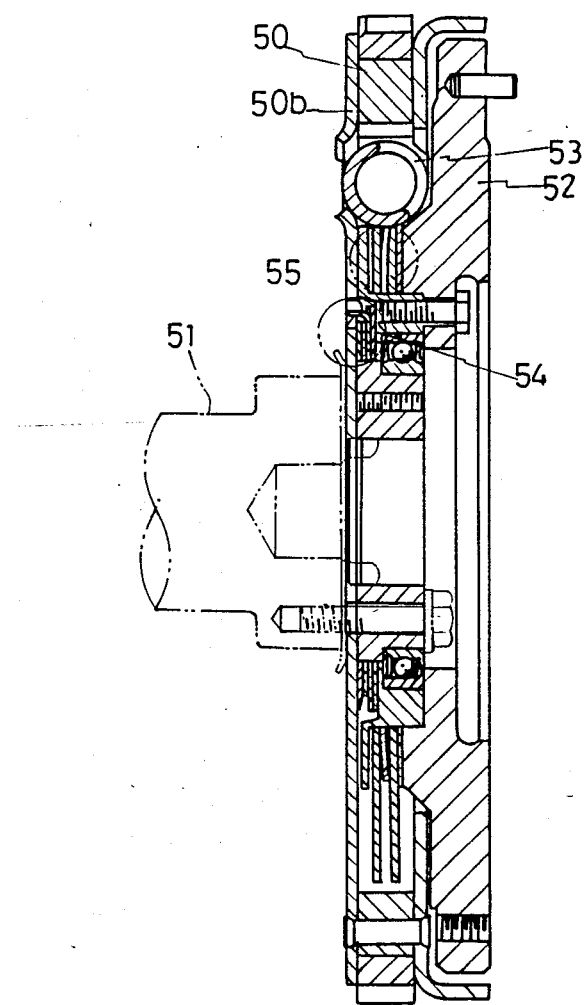
FIG. 6 is a sectional view of the conventional device and corresponds to FIG. 2.
Figure 7:
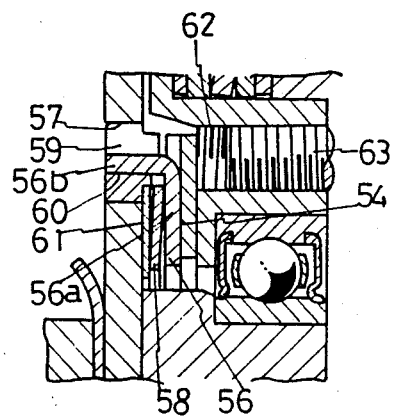
FIG. 7 shows an enlarged sectional view of a hysteresis mechanism of the prior art of this invention.

During the operation of the device, abraded dust is generated in the hysteresis mechanism 17. The abraded dust will be discharged through a clearance 22 formed between the inner body 2b and the side plate 1c. A lubricant or grease is enclosed in the bearing means 12. In the prior art device (see FIGS. 6,7), the frictional member 56a of the hysteresis mechanism is located in front of the bolt hole 62. If the bearing means 12 is broken, the enclosed lubricant or grease leaks from the bearing means 12. Due to such leakage, the frictional force between the hysteresis plate 56 and the friction lining 56a cannot provide a stabilized frictional force. As a consequence, the coefficient of friction is decreased and a resonate vibration will occur during operation of the device. In the present invention, the friction plate 18 of the hysteresis mechanism is positioned between the side plate 1c and the thrust plate 19. Accordingly, if the lubricant or grease leaks from the bearing means 12, the adverse effects of the leakage is eliminated in this device.

Figure 4:
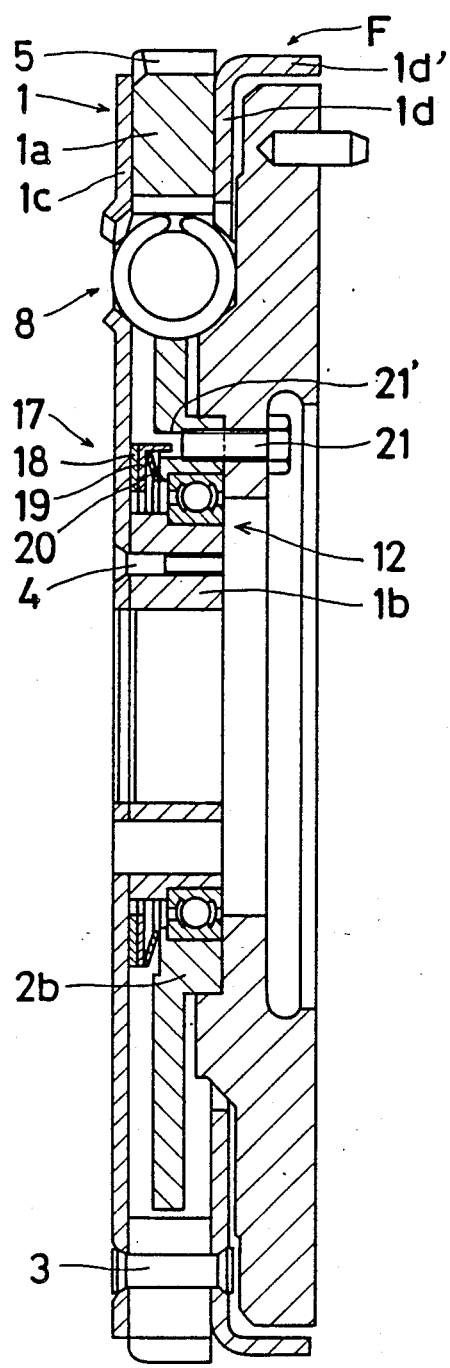
FIG. 4 is a sectional view showing another embodiment of this invention.

FIG. 4 illustrates another embodiment of this invention. In this embodiment, the torque limiting mechanism is not provided. Without the torque limiting mechanism, the same function can be easily obtained in a manner similar to the above-mentioned embodiment.

Figure 5:
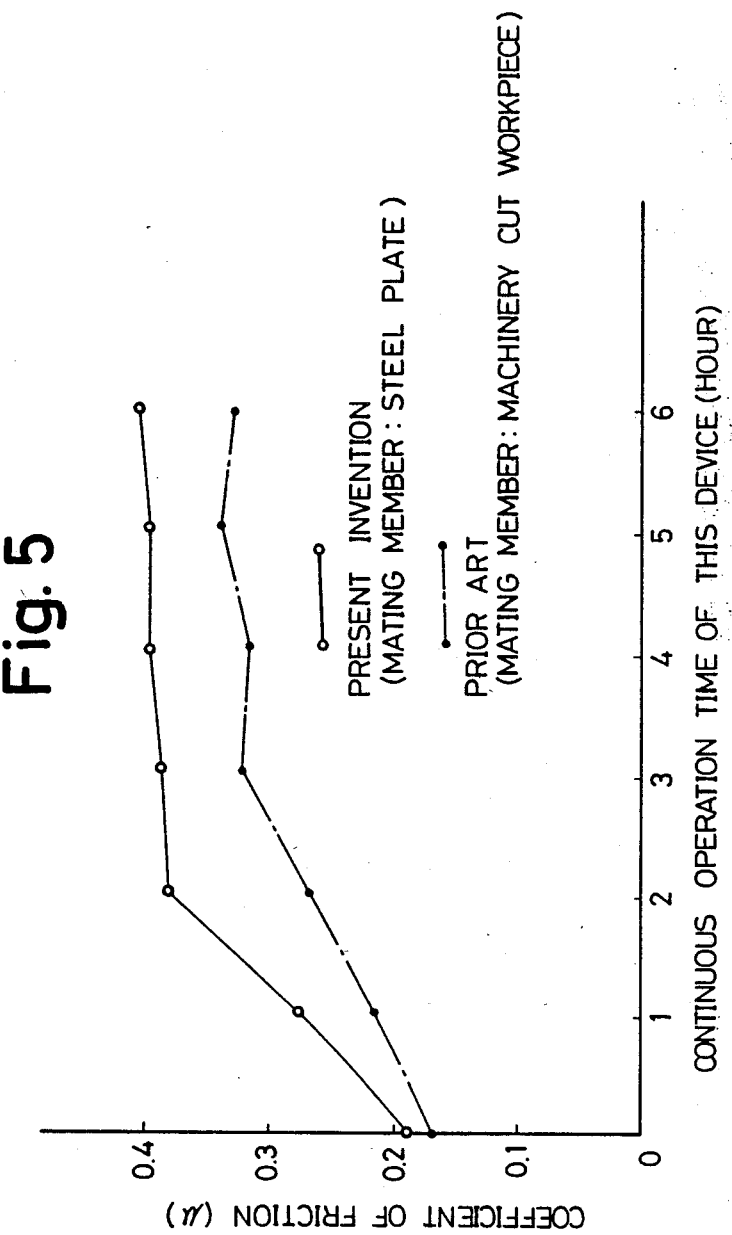
FIG. 5 is a graph relationship between the continuous running time of the device and coefficient of friction lining.

FIG. 5 shows the relationship between the time of starting operation of the device and the coefficient of friction. As time elapses, the coefficient of friction of the member can be reduced into a stable coefficient.

As understood from the above, in the present invention, the bolt hole is provided through which the bolt is passed so as to fasten together the drive side flywheel and the driven side flywheel. As the bolt hole extends into the hysteresis mechanism, the abraded dust of the friction lining may be excluded through the clearance provided by the present arrangement.

Other benefits derived from the present invention come from the fabrication of the member of the hysteresis mechanism mainly with polyimide resin and they include an enhanced effect of vibration absorbing on account of a high coefficient of friction, an increased durability on account of good anti-wear properties and a stabilized performance due to only small changes in the coefficient of friction.

Although only several preferred embodiments of the present invention have been described in detail, it will be appreciated by those skilled in the art that various modifications and alternations can be made of the preferred embodiments shown without materially departing from the novel teachings and advantages of this invention. Accordingly, it is to be understood that all such modifications and alterations are included within the scope of the invention as defined by the following claims.

What is claimed is:

1. A torque variation absorbing device comprising a flywheel assembly connected to an engine crankshaft and defining an inertia body divided into two parts including a drive side flywheel and a driven side flywheel, said drive side flywheel and said driven side flywheel being rotatably supported for rotation about an axis by a bearing arrangement which is positioned between the drive side flywheel and the driven side flywheel, said driven side flywheel comprising first and second bodies, said first body including a plurality of circumferentially spaced threaded holes, a plurality of threaded bolts disposed in said holes for connecting said second body to said first body, said bolts terminating short of ends of said holes facing said drive side flywheel, said first body and said drive side flywheel being axially spaced to define a gap therebetween, a spring mechanism operative to transfer torque between the drive side flywheel and the driven side flywheel, and a hysteresis mechanism positioned radially inwardly of both said spring mechanism and said gap, said hysteresis mechanism comprising a thrust plate including bent portions extending into said ends of said holes left unoccupied by said bolts, spring means biasing said thrust plate toward said drive side flywheel, and a friction plate axially compressed between said thrust plate and said drive side flywheel, said friction plate disposed in radial alignment with said gap so that dust abraded from said friction plate is discharged into said gap.

2. A device according to claim 1 wherein said second body comprises an inertia body, said first body being disposed axially between said inertia body and said drive side flywheel.

* * * * *